Patented Sept. 10, 1940

2,214,703

UNITED STATES PATENT OFFICE 2,214,703

CERAMIC THREAD GUIDE AND THE LIKE

Hans Thurnauer, Chattanooga, Tenn., assignor to American Lava Corporation, Chattanooga, Tenn., a corporation of Tennessee No Drawing. Application November 17, 1937, Serial No. 175,171

11 Claims. (Cl. 25—157)

This invention relates to the manufacture of thread guides such as used in various forms and designs and involves the substitution of a ceramic crystalline structure wherever glass, porcelain, metal, metalloids, metal carbide, artificial ruby, agate, etc., is now used in the construction of textile machinery or appurtenances thereto and textile appliances, by which is meant bleachery rings, buttons, creel buttons, glass dents, glass parts, glass rings, glass rods, glass tubes, grooved eyes, pigtails, pins, pulleys, quiller guides, shuttle eyes, steps, tensions, traverse buttons, wet twister guides, and other such similar parts although frequently called by different names by different manufacturers, the principal object of this invention being the production of a material of improved surface characteristics, hardness, and of greater mechanical strength.

It is known in the art that thread guides and the like used in the textile industry are required to have the following properties:

1st. They must have a hard surface to resist the cutting action of the thread.

2nd. Their surface has to be of such a smoothness as not to cut the thread.

3rd. The mechanical strength of the thread guides has to be high enough to resist any mechanical strains or impact.

4th. They must be resistant against the action of acids and alkalies because frequently they come in contact with various corroding chemicals.

5th. It must be possible to work the material into intricate shapes and to exact dimensions.

6th. They have to be low in price and their manufacture has to be economical.

Various materials such as porcelain, steatite, acid resistant metallic alloys, glass, agate, artificial ruby, etc., have been suggested and tried out for textile thread guides but no material has heretofore been found which combines all of the above properties in one.

It is with the above facts in view that the present invention has for its objects the combination of the above properties into one single material and consists, generally stated, in working $TiO_2$ (titanium dioxide) in pure form, or as chief ingredient in combination with other materials, into desired shapes according to ceramic methods and burning the articles thus shaped at a temperature which gives complete vitrification.

A detailed description of the raw materials used and of the manufacture of thread guides according to this invention is as follows:

As chief raw materials for the manufacture of these thread guides are used: Titanium dioxide either in the precipitated form or calcined to temperatures between 1000 to 1400° C. or powdered rutile material, preferably airfloated. These materials are used either separately or in combination with each other and in the latter instance are mixed carefully, wet or dry, to obtain a uniform mixture. This is to be done according to known ceramic methods and anyone skilled in the art of making ceramic bodies will be able to prepare a body which is suitable for casting, wet pressing, dry pressing, or extruding.

Precipitated $TiO_2$ has a certain plasticity which makes it possible to shape simple forms without addition of a plastifier. For more difficult or complex shapes it is desirable to have higher plasticity and in such cases it is possible to use organic binders such as dextrin, goulac, or wax to obtain the necessary plasticity. As an example of a batch which after firing consists practically of pure titanium dioxides the following formulas may be given:

| | Per cent |
|---|---|
| Titanium dioxide precipitated and calcined at 1000° C | 48 |
| Titanium dioxide calcined at 1300° C | 48 |
| Dextrin | 4 |

If such a mixture is fired in a neutral or oxidizing kiln atmosphere to 1350° C. to 1400° C. (depending upon the method used in firing the article), a perfectly vitrified product is obtained which is extremely hard and which has a surface which can be polished readily. Such a material has high mechanical strength and is resistant to the actions of acids and alkalies.

It further has been found that vitrified bodies of extreme hardness and smoothness are obtained by the addition of fluxes to $TiO_2$. These fluxes not only help to vitrify the body but also increase the hardness of the article. Such fluxes are clay, kaolin, feldspar, aluminum oxide, and generally all substances which lower the vitrification temperature of $TiO_2$. The maximum amount of fluxes which can be added to $TiO_2$ without changing the properties of the body considerably is approximately 20%.

As an example of a body which vitrifies at 1340° C. and has a very hard surface, may be mentioned the formula:

| | Per cent |
|---|---|
| $TiO_2$ | 85 |
| Florida kaolin | 10 |
| N. C. feldspar | 5 |

It is further possible to grind, machine, or polish thread guides or fired blanks made according to this invention by means of saws, carborundum wheels, diamond dust wheels, or those using other materials which have the same or greater hardness than the thread guides themselves. Such a grinding operation gives a polish hitherto unknown to any other ceramic material.

From the foregoing description it will be apparent that I have thus provided a very simple process for making the various types of products mentioned in the forepart of this specification, the process being capable of being carried out by anyone skilled in the ceramic art. It is thought that the method and advantages thereof as well as the superiority of the product will be apparent to one skilled in such art without further explanation.

While I have described the preferred method it should be understood that I reserve the right to make any such changes in the detailed steps of the process and also the proportion of the different ingredients, temperatures employed, and the like, as will not depart from the spirit of the invention or the scope of the claims hereunto appended.

Having thus described the invention, I claim:

1. Textile thread guides made of titanium dioxide and manufactured according to ceramic methods and fired to a vitrification temperature between 1350 and 1400° C. in a neutral or oxidizing kiln atmosphere.

2. A textile thread guide formed of a mixture of titanium dioxide precipitated and calcined at a temperature of approximately 1000° C. titanium dioxide calcined at a temperature of approximately 1300° C., together with a relatively small proportion of an organic binder.

3. A thread guide for textile machinery, formed of a mixture of batches of precipitated titanium dioxide, the respective batches being calcined at temperatures of approximately 1000° and 1300° C., together with a relatively small proportion of an organic binder, said mixture being vitrified.

4. A thread guide for textile machinery, formed of a mixture of batches of precipitated titanium dioxide, the respective batches being calcined at temperatures of approximately 1000° and 1300° C., together with a relatively small proportion of an organic binder, and a mineral flux to lower the vitrification temperature.

5. A textile thread guide formed of a mixture of titanium dioxide precipitated and calcined at a temperature of approximately 1000° C., titanium dioxide calcined at a temperature of approximately 1300° C., together with a relatively small proportion of an organic binder, and a mineral flux serving to lower the required vitrification temperature, the mixture being shaped and fired to effect vitrification, and the product being polished.

6. A process for the manufacture of ceramic thread guides and the like, comprising making a mix of titanium dioxides calcined at respectively different temperatures, one of said titanium dioxides being also precipitated, adding an organic binder serving as a plasticizer together with a flux to lower the required vitrification temperature, shaping the desired article from the resultant mass, and firing the article at a vitrification temperature.

7. A process for the manufacture of ceramic thread guides, and the like, forming a part of textile machines, comprising making a mix of titanium dioxide precipitated and calcined at a temperature of approximately 1000° C., titanium dioxide calcined at a temperature of approximately 1300° C., and a relatively small proportion of an organic binder, adding a flux of a clayey substance to lower the vitrification temperature of the mix, shaping the desired article from the resultant mass, and firing the article to the vitrification point.

8. A process for the manufacture of ceramic thread guides, and the like, forming a part of textile machines, comprising making a mix of titanium dioxide precipitated and calcined at a temperature of approximately 1000° C., titanium dioxide calcined at a temperature of approximately 1300° C., and a relatively small proportion of an organic binder, adding a flux of a clayey substance to lower the vitrification temperature of the mix, shaping the desired article from the resultant mass, firing the article to the vitrification point, and polishing the vitrified article.

9. A process for the manufacture of ceramic thread guides, and the like, forming a part of textile machines, comprising making a mix of titanium dioxides precipitated and calcined at a temperature of between 1000° and 1400° C., approximately 96%, and about 4% of an organic binder, shaping the desired article from the mix, and firing the article to effect vitrification.

10. A process for the manufacture of ceramic thread guides, and the like, forming a part of textile machines, comprising making a mix of two titanium dioxides precipitated and calcined at temperatures between 1000° and 1400° C., approximately 96%, and about 4% of an organic binder, shaping the desired article from the mix, and firing the article to effect vitrification, the titanium dioxides being approximately 48% each and the binder constituting the remaining 4%.

11. A process for the manufacture of ceramic thread guides, and the like, forming a part of textile machines, comprising making a mix of titanium dioxides precipitated and calcined at a temperature of between 1000° and 1400° C., approximately 96%, and about 4% of an organic binder, shaping the desired article from the mix, and firing the article to effect vitrification, the combined titanium dioxide content being about 85% and including or having added thereto approximately 15% of mineral flux.

HANS THURNAUER.